Figure 5:
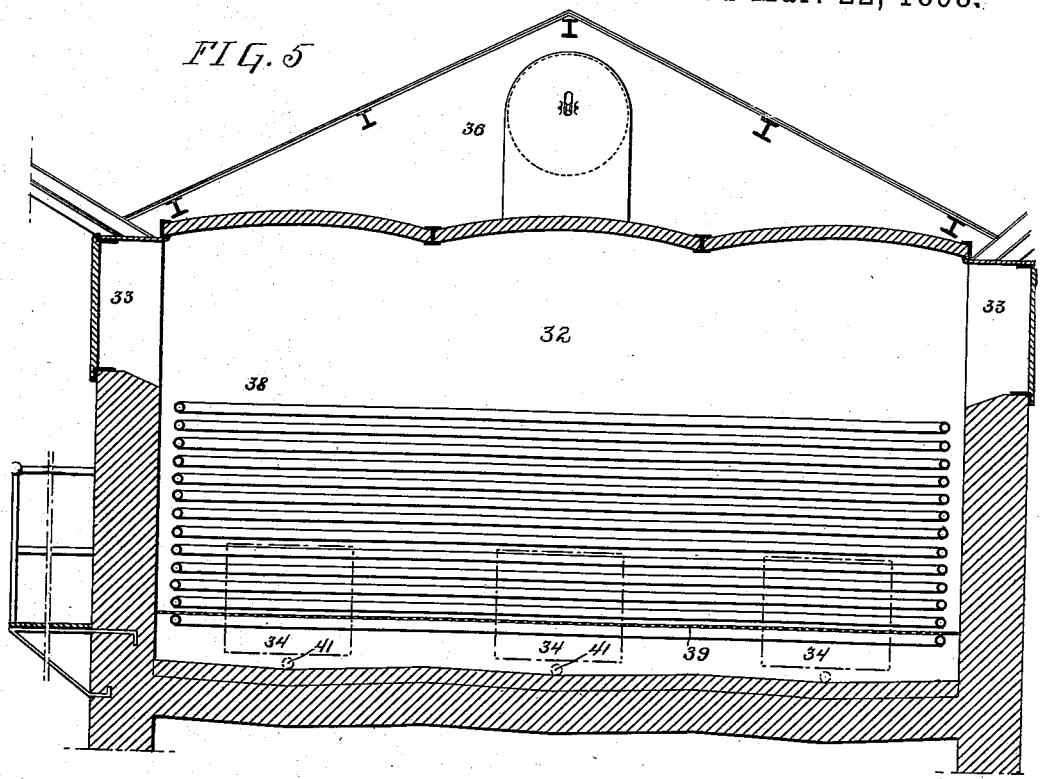

(No Model.)
J. J. DEERY.
APPARATUS FOR PURIFYING LIQUIDS.
No. 601,052. Patented Mar. 22, 1898.
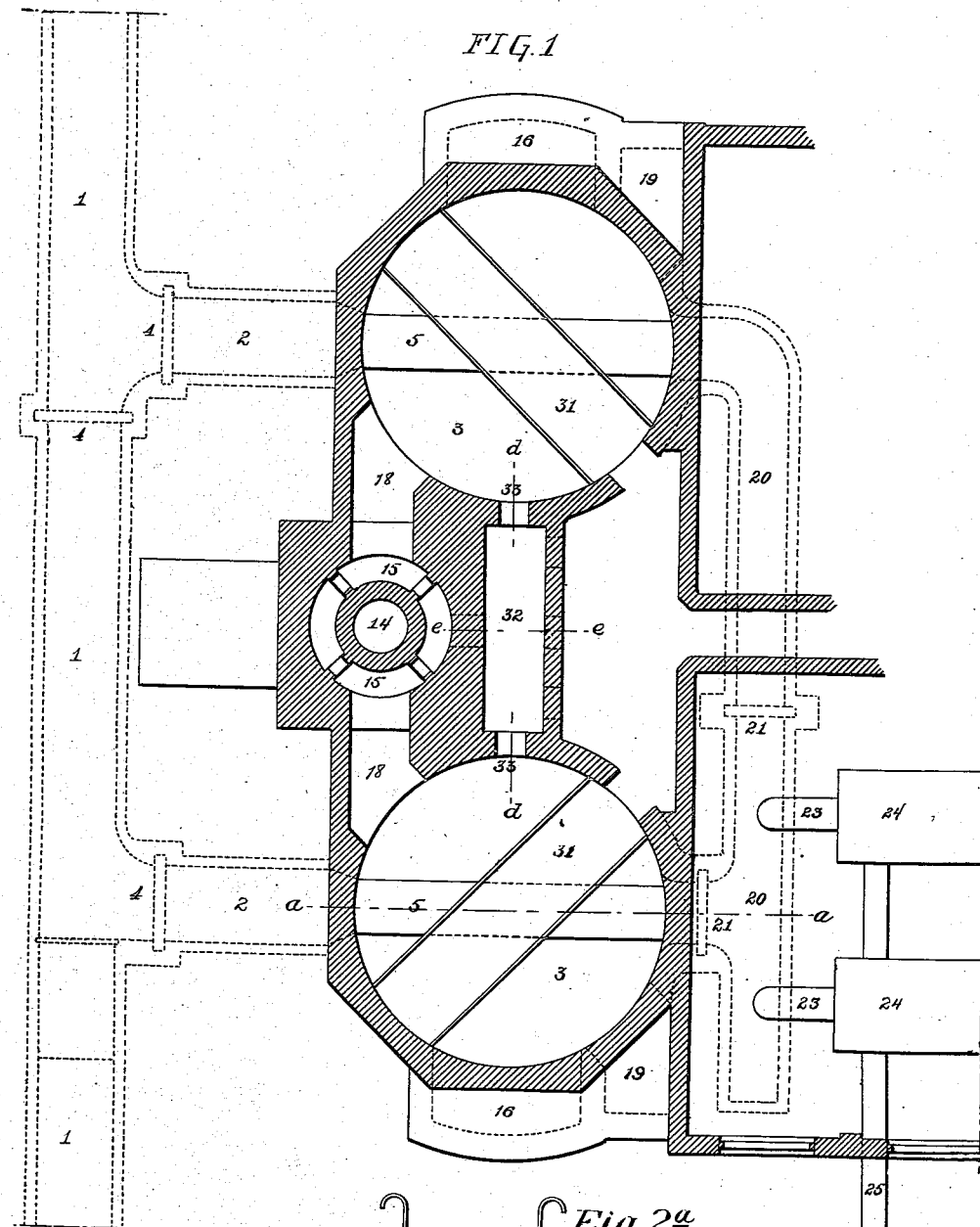
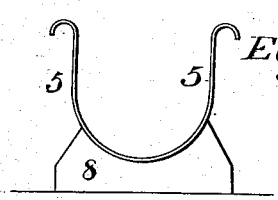
Witnesses:
Inventor:
John Jerome Deery,
by his Attorney, (No Model.)
9 Sheets—Sheet 2.
J. J. DEERY.
APPARATUS FOR PURIFYING LIQUIDS.
No. 601,052. Patented Mar. 22, 1898.
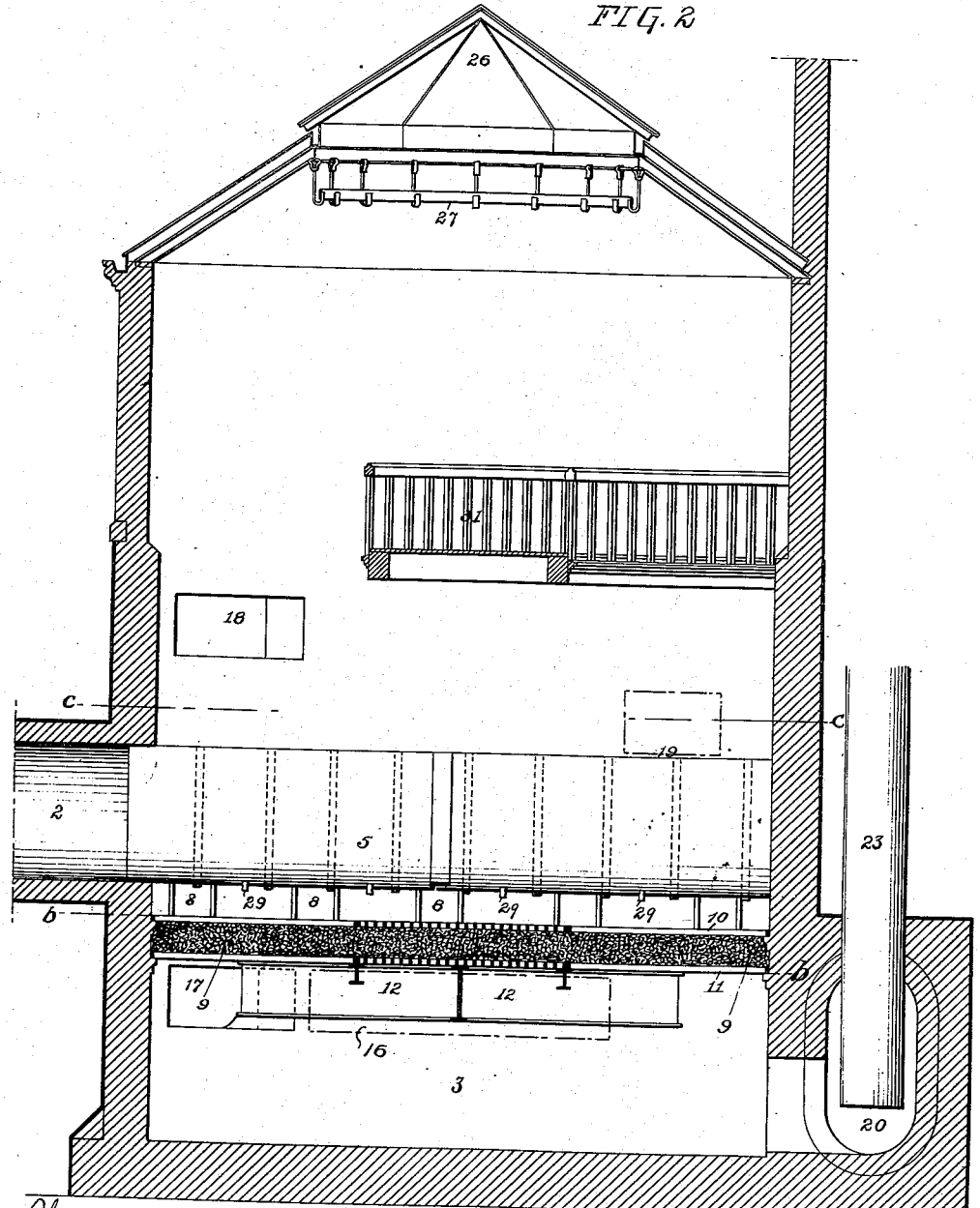

(No Model.)
J. J. DEERY.
APPARATUS FOR PURIFYING LIQUIDS.
No. 601,052. Patented Mar. 22, 1898.
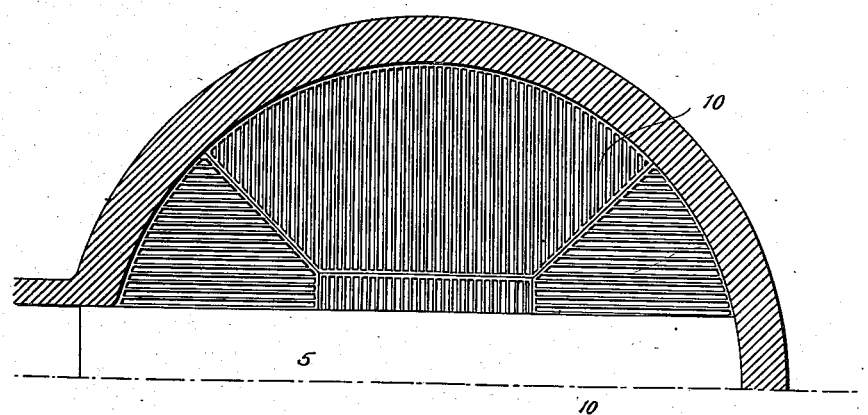
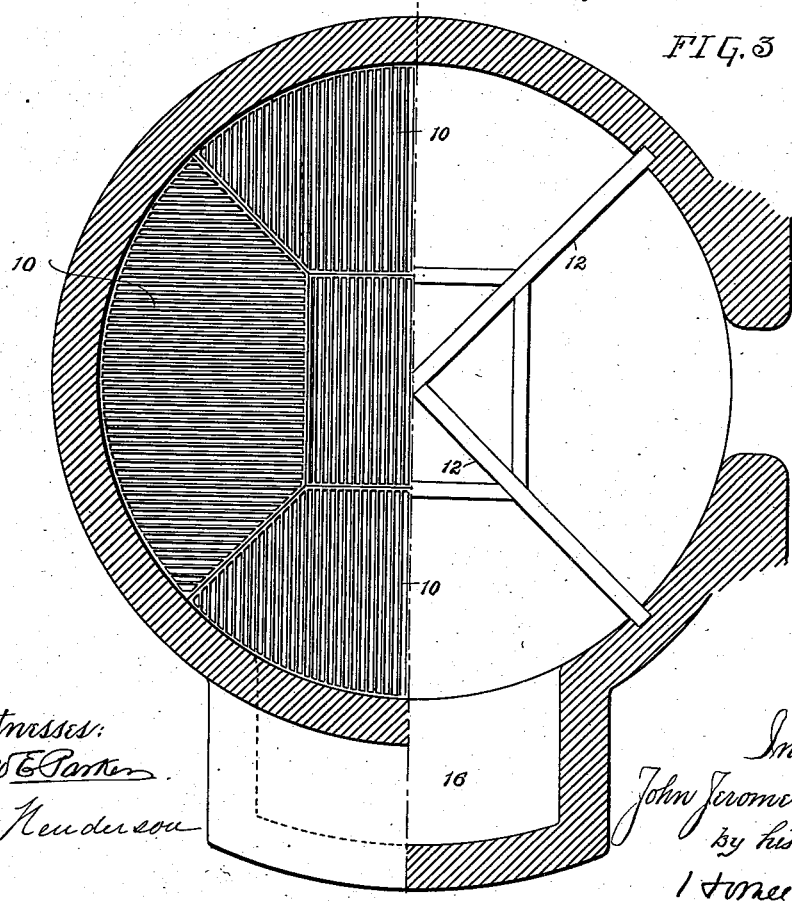

(No Model.)

J. J. DEERY.
APPARATUS FOR PURIFYING LIQUIDS.

No. 601,052.

Patented Mar. 22, 1898.

9 Sheets—Sheet 4.

Witnesses:
Jno. E. Parker
J. Henderson

Inventor:
John Jerome Deery,
By his Attorney,
I. Mee Pettit (No Model.) 9 Sheets—Sheet 5.

J. J. DEERY.
APPARATUS FOR PURIFYING LIQUIDS.

No. 601,052. Patented Mar. 22, 1898.

(No Model.)

9 Sheets—Sheet 6.

J. J. DEERY.
APPARATUS FOR PURIFYING LIQUIDS.

No. 601,052.

Patented Mar. 22, 1898.

(No Model.) 9 Sheets—Sheet 8.

J. J. DEERY.
APPARATUS FOR PURIFYING LIQUIDS.

No. 601,052. Patented Mar. 22, 1898.

(No Model.)  J. J. DEERY.  9 Sheets—Sheet 9.
APPARATUS FOR PURIFYING LIQUIDS.
No. 601,052.  Patented Mar. 22, 1898.
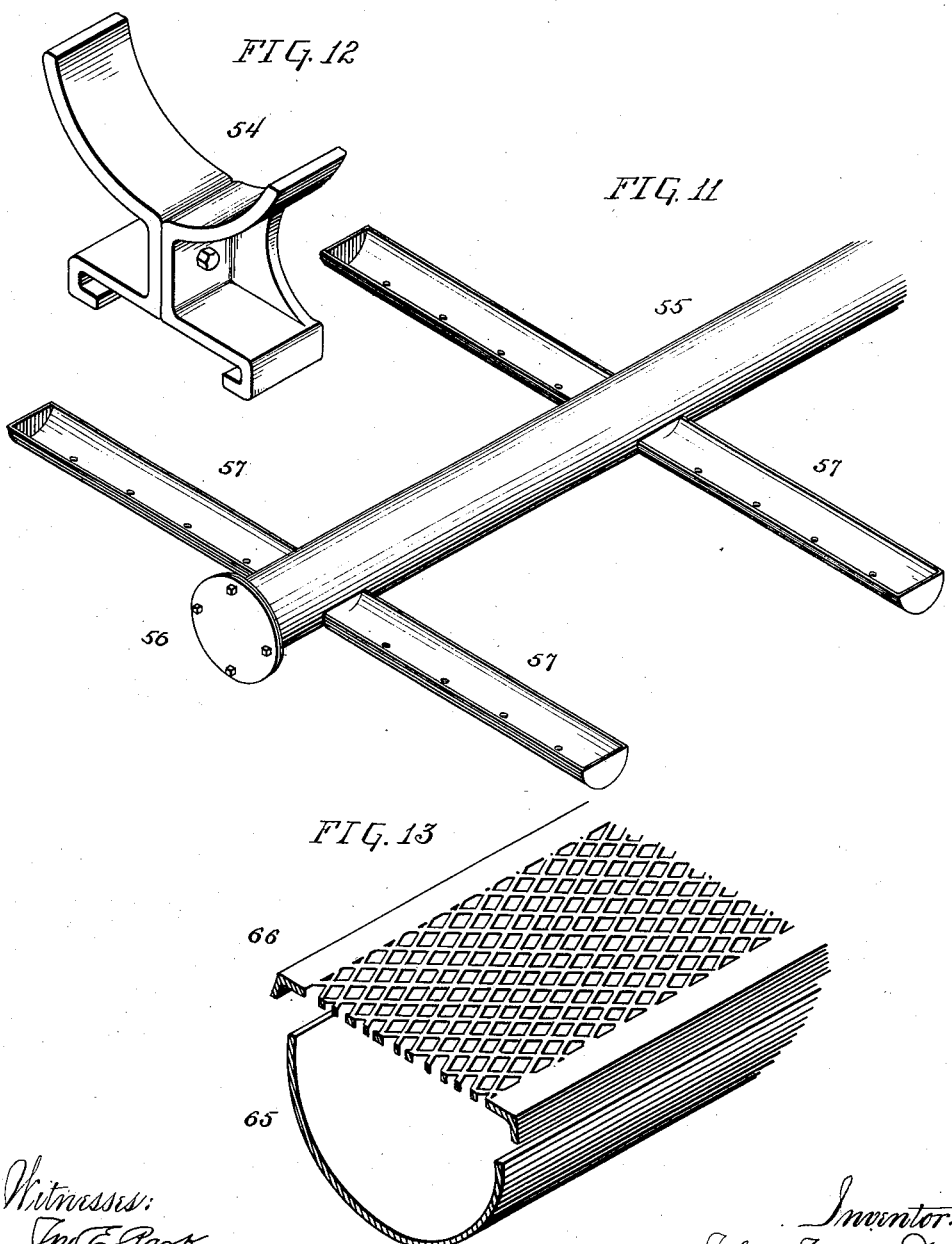

UNITED STATES PATENT OFFICE.

JOHN JEROME DEERY, OF PHILADELPHIA, PENNSYLVANIA.

APPARATUS FOR PURIFYING LIQUIDS.

SPECIFICATION forming part of Letters Patent No. 601,052, dated March 22, 1898.

Application filed April 20, 1896. Serial No. 588,220. (No model.)

*To all whom it may concern:*

Be it known that I, JOHN JEROME DEERY, a citizen of the United States, and a resident of the city of Philadelphia, State of Pennsylvania, have invented a certain new and Improved Apparatus for the Purification of Liquids, of which the following is a full, clear, and exact description, reference being had to the accompanying drawings, forming part of the specification.

My invention relates to the purification of water and other liquids with especial reference, as hereinafter described, to the purification and disposal of sewage, its object being to provide at a convenient point a pumping-station connected to the sewers and to which all the sewage to be treated is conducted. The sewage is at this point filtered and oxygenized and aerated, and the solid matter is separated from the liquid, which latter is then conducted to a filtering plant preferably situated at a point where the liquid may be conveniently disposed of after passing through the filters, the clarified effluent being practically pure and in a condition in which it may be continuously discharged into a running stream or may be conducted to fields for irrigation or otherwise. The water or liquid by this apparatus is purified in its percolation by gravity through these filter-beds either in upper or lower level, so as to destroy disease-bearing germs by the action of hardy micro-organisms maintained therein, and to afford free passage for the air to keep alive and to induce the growth of healthy bacilli and micro-organisms for purification purposes and exposing the liquid and disease-bearing germs to the purifying action of light, air, and electrical influences, with the consequent purification of the water or liquids and the removal of all animal and vegetable matter detrimental to health.

Figure 6:
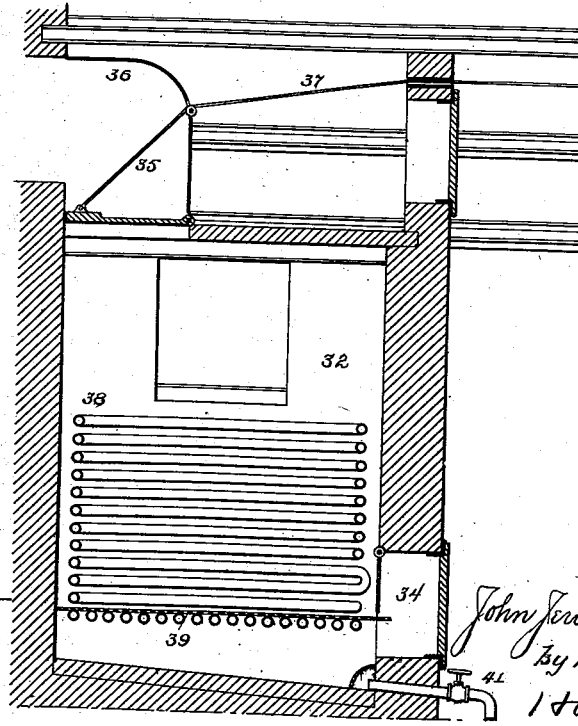
Figure 7:
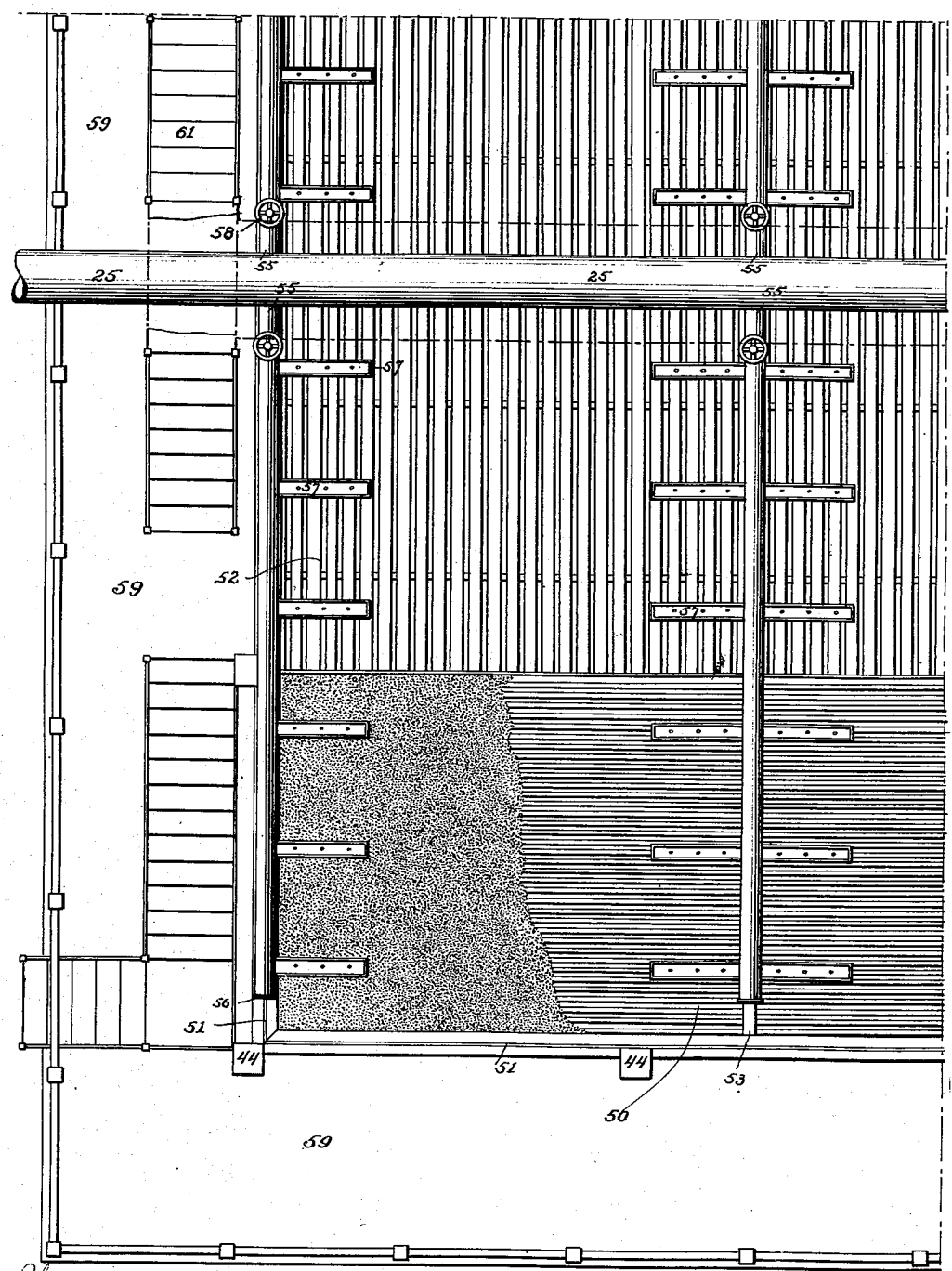
Figure 8:
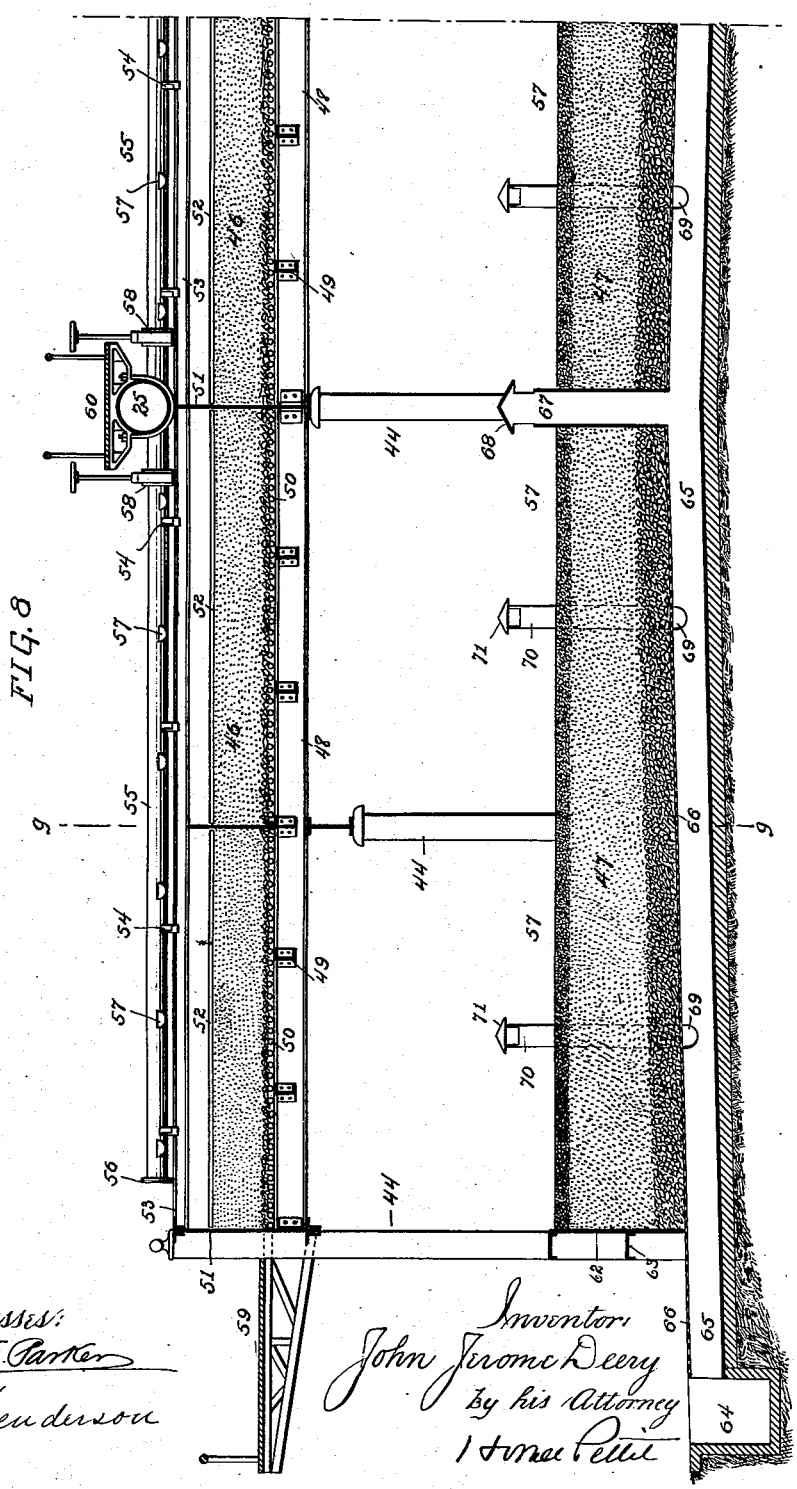
Figure 9:
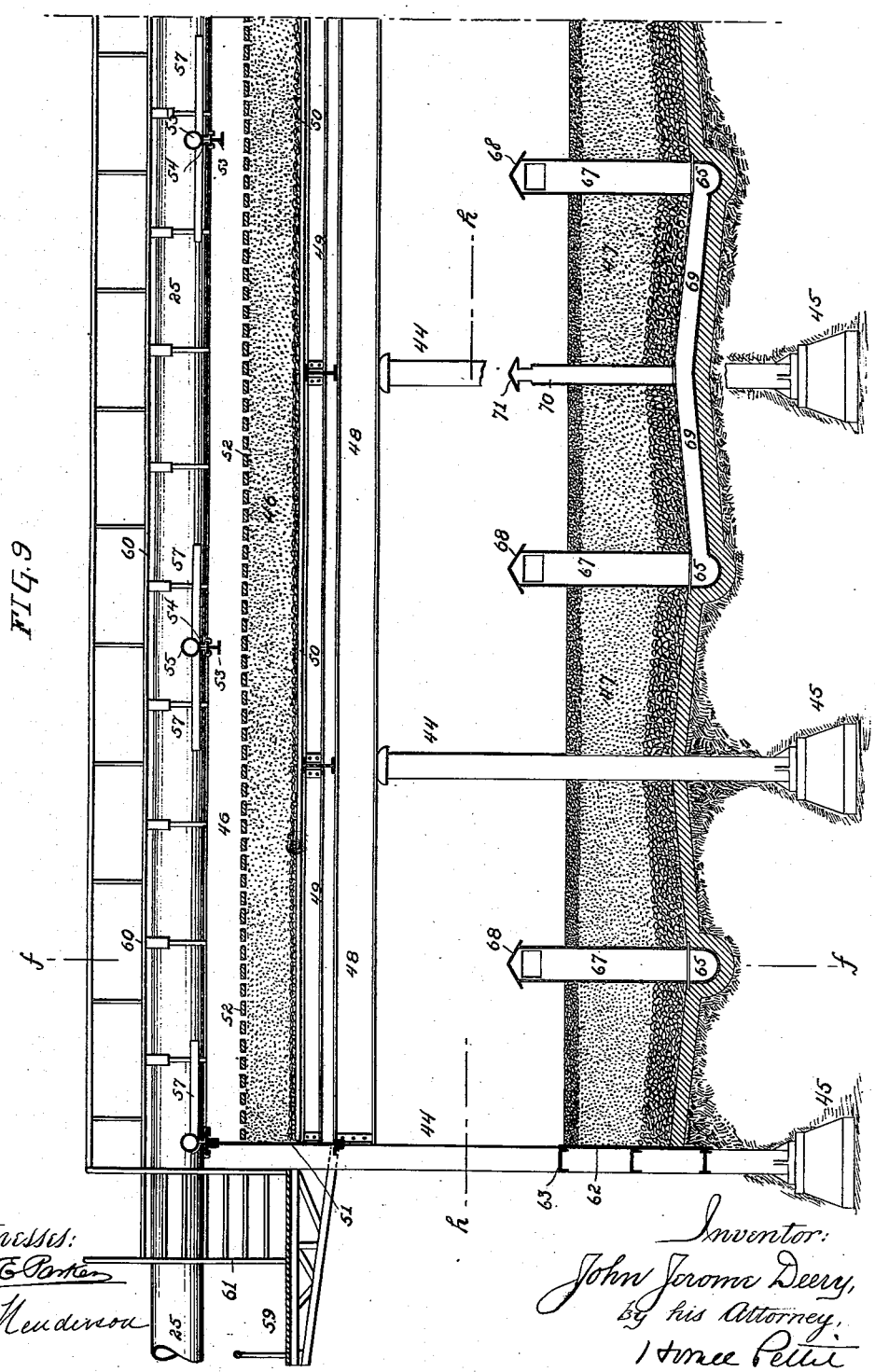
Figure 10:
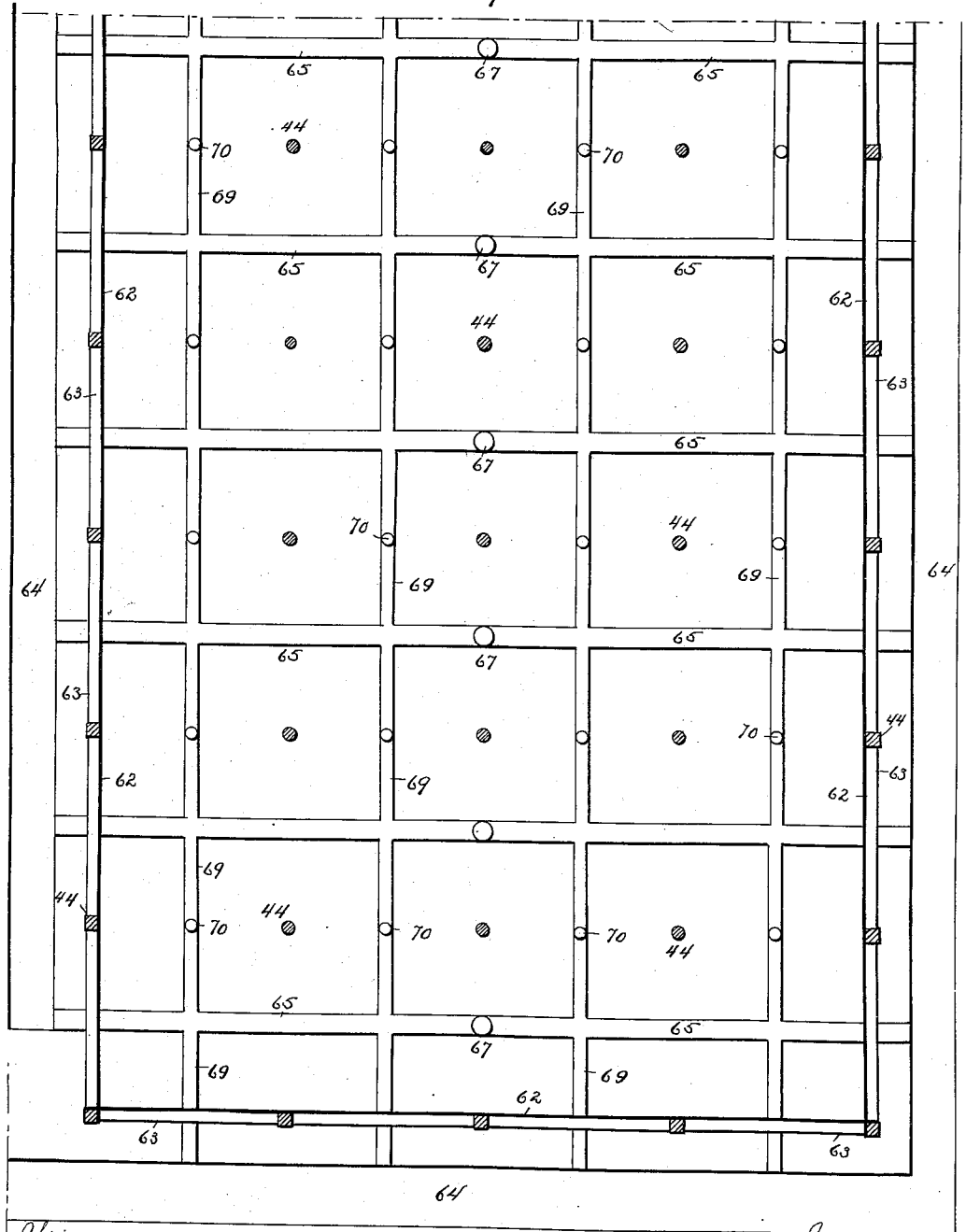

In the accompanying drawings, Figure 1 is a general diagram illustrating the arrangement of the receiving reservoirs or chambers and pumping-station. Fig. 2 is a transverse sectional elevation on the line $a\,a$, Fig. 1, of one of the receiving-reservoirs. Fig. 2$^a$ is a transverse sectional elevation of the distributing-trough shown in Fig. 2. Fig. 3 is a sectional plan view on the line $b\,b$, Fig. 2. Fig. 4 is a partial sectional plan view on the line $c\,c$, Fig. 2. Fig. 5 is a longitudinal sectional elevation of the grease-oven on the line $d\,d$, Fig. 1. Fig. 6 is a transverse sectional elevation of the same on the line $e\,e$, Fig. 1. Fig. 7 is a plan view of a portion of the filtering plant. Fig. 8 is a partial transverse section of the same on the line $f\,f$, Fig. 9. Fig. 9 is a partial longitudinal section of the same on the line $g\,g$, Fig. 8. Fig. 10 is a sectional plan view, on a smaller scale, on the line $h\,h$, Fig. 9; and Figs. 11, 12, and 13 are perspective views of details of construction more particularly referred to hereinafter.

Referring, first, to the receiving and pumping station illustrated in Figs. 1 to 6, inclusive, 1 represents a sewer of sufficient size to deliver the sewage to be purified. From the main sewer extend transverse sewers or pipes 2 2, which lead, respectively, to the receiving chambers or reservoirs 3 3, each chamber being of sufficient capacity to receive the entire amount to be operated upon, so that one receiver only should be in use at a time, and to that end a series of valves 4 are provided in the sewer 1 and ducts 2 to direct and control the flow of the sewage to the reservoirs, making it possible to operate separately or jointly, each reservoir being thereby provided with means to make charges or renewals of filtering materials or for repairs and for a thorough aeration while in readiness for immediate use. The mouths of the pipes or ducts 2 enter the reservoirs 3 some distance above the bottom of the latter and are received by a "distributer" extending across and over the center of screening-floors, being an open-top sheet-iron vessel 5, semicircular in cross-section and having its edges extended vertically to height of sewer, and then turned over to form a lip over which the sewage may fall in a thin, even, regular stream, the coarse and heavy particles of matter being retained in the distributer and being removed from time to time, as may be necessary. During the treatment of the liquid the doors and passages leading to and from the reservoirs are preferably hermetically sealed, so as to prevent the escape of foul air and to prevent any interference with the currents of fresh air which are introduced to carry off such foul air and aerate the liquid.

The distributer 5 is provided with a number of metal shoes or blocks 8, which rest on a screening-floor 9, onto which the sewage falls from the distributer, the purpose of dividing it into a thin stream being to thoroughly aerate the sewage and to expose and destroy the organic or oxidable matter which it contains. In the bottom of the distributer 5 are a number of openings closed by removable plugs or valves 29 for draining the distributer when the flow of liquid is stopped. The screening-floor 9 is arranged at some distance above the bottom of the reservoir and comprises two wrought-iron sectional screens 10 and 11, the lower screen 11 permanently resting upon a series of girders 12, which extend into the walls of the reservoirs, while the upper screen is removable.

Adjacent to the two reservoirs is a chimney having a central flue 14 for the escape of the products of combustion from the boiler of the plant and an annular flue 15, which extends from the bottom to the top of the stack and in which is created an upward current owing to the heat-radiating surfaces of the central flue by the escaping products of combustion within it.

At a point immediately below the screening-floor 9 each reservoir has a fresh-air duct 16, leading from the outer air, and a vent-flue 17, located about diametrically opposite and on the same level as the fresh-air duct 16, the vent communicating with the annular flue 15, and thus creating a constant circulation of fresh air in the reservoir below the screening-floor and thoroughly aerating the filtered liquid as it passes through the screening-floor and falls to the bottom of the reservoir, the oxidable matter uniting with the oxygen of the air and being consumed, while at the same time a portion of the air passes up through the screening-floor, aiding the oxidation process of the contained filtering material, and escapes through a vent-flue 18, also leading to the annular flue 15.

In the wall of the reservoir above the screening-floor is a second fresh-air duct 19, which is about diametrically opposite an escape-vent 18, the two air-ducts 16 and 19 supplying an extremely large volume of fresh air to the reservoirs, which air flows across the reservoir at points both above and below the screening-floor and also passes through said screening-floor in such a manner as to thoroughly aerate the sewage as it falls in a thin stream from the sides or edges of the distributer to the screening-floor 9, and, again, while passing through the screening-floor and filtering material and while falling from the lower surface of the screen to the bottom of the reservoir the foul air escapes through the vents 17 and 18, both of which lead to and are in communication with the annular escape-flue 15, surrounding the central flue 14 of the chimney or stack.

The material used as a filter is preferably coke, charcoal, or similar substance, which after being used several times becomes broken into small particles and may be used as a fuel under the boilers after its usefulness as a filtering medium has been destroyed, or the material may be spongy iron or furnace-slag. These articles retain all grease and some of the matter in suspension in the sewage and can be used for a long time before they become so clogged as to prevent the passage of the sewage, at which time the flow of sewage is directed to the opposite reservoir and the upper screening-floor is removed and the coke or filtering material hoisted to the grease-ovens hereinafter described, where by the application of heat the coke or other material yields up the grease which it may have absorbed and is thoroughly dried until it is again in condition for use as a filter.

At the rear of the reservoirs is a pipe 20, provided with suitable gate-valves 21 to govern the flow of the sewage after it passes through the screening-floor and on its way to the pump-suction chamber, into which dip the suction-pipes 23 of one or more pumps 24, having delivery-pipes 25, through which the partially-purified sewage is pumped to filtering-beds generally located at some distance from the receiving and pumping station and situated at some point where its final distribution may be more readily accomplished.

The filtering-station should be situated on or near the bank of a stream, into which the thoroughly-purified sewage may be finally discharged, or by irrigation over fields, or otherwise. As a matter of convenience the receiving and pumping station should be situated somewhat nearer the center and low point of the locality to be sewered; but it will be understood that this is always a question of topography, and in many instances the receiving and pumping stations may be together and even the use of a pump be avoided, so that the liquid may flow by gravity to the filtering-station from the sewers or settling-basins.

At the top of the reservoir is a skylight 26 for admitting during the daytime a steady and constant light from without to assist in the purification through the medium of the rays, around the lower portion of which skylight is hung a rail 27, on which may be supported a hoisting device of any suitable construction to be employed in raising the distributer and the various sections of the grating and when it becomes necessary to hoist or lower the filtering material. When the distributer is to be cleaned, it may be connected to any suitable hoist and raised and preferably suspended under the floor of the bridge 31, or in sections may temporarily be slid into the sewer. After the distributer is removed the various sections 10 of the screening-floor may be lifted, the sludge and heavy matters precipitated on the floor being first shoveled into buckets and disposed of, and the coke or other material is hoisted in tilting buckets to the level of the grease-oven door and then dumped into the grease-oven 32 through either one of the doors 33, each of which opens into one of the receiving-reservoirs. (See Figs. 5 and 6.) The grease-oven comprises a brick chamber entirely inclosed and provided with a series of doors 33 for the entrance of the coke or filtering material to be acted upon.

34 is a series of doors for the discharge of the coke, and 35 for the ventilation of the oven and the discharge of gases, which arise from the coke during the heating thereof. The door 35 is at the lower end of a hood-shaped pipe 36, leading directly to the annular flue 15, and is normally held closed by gravity, a metal cord or chain 37, extending through the front wall of the oven, being provided for its opening. Within the chamber, extending around the walls thereof, is a series of pipes 38, forming a cradle for the reception of the coke or filtering material, the bottom row of pipes extending across the oven and forming a false floor or bottom, on which rests a wire-netting or wrought-iron slat-screen 39, forming a support for the coke or other material, but permitting the passage of the grease as it is melted and falls through the screen, the grease collecting at the bottom of the oven and being tapped off from time to time through cocks 41 into barrels or other suitable receptacles. The coke or other material is subjected to the action of the steam-pipes until it is thoroughly dried and is then shoveled out through the doors 34 to be again used as a filtering medium or to be sent to the boilers for use as a fuel. The filtered and aerated sewage after falling through the screening-floors is collected in pump-suction chambers and is then pumped to the filtering-beds, as hereinafter described. The effluent is pumped or flows through the pipe 25 from the receiving and pumping station to the filtering-station illustrated in Figs. 7 to 13, inclusive.

44 represents a series of equidistant posts, preferably formed of cast metal, or may be piers of masonry, and each having a concrete or other foundation 45. On the upper ends of these posts is supported an elevated filter-bed 46, formed of layers of various sizes of broken stone, slag, or pebbles, and on top of it clean fine sand, through which the liquid from the pipe 25 and distributing-pipes 55 percolates and falls in drops to a lower filter-bed 47, formed around the various supporting-posts, and from the lower portion the then thoroughly-purified liquid is finally discharged.

The superstructure forming the elevated filter-bed comprises a series of girders 48, on which rest cross-beams 49, these in turn supporting a filter-support 50, formed of a large number of small iron pipes placed closely together, or, if desired, these may be formed of wooden slats or of wrought-iron grating or otherwise, so arranged as to support the fine sand which forms a filtering medium. Secured to the outer rows of posts is a deep girder 51, or may be of masonry, which extends entirely around the filter and forms the side support for the sand, and in practice a series of these girders or walls extend crosswise of the structure, dividing the filter into a number of compartments, each forming a separate filter provided with separate liquid supplies which may be stopped at intervals to permit the cleansing of the filter and the renewal of the sand. In Fig. 8 is shown one of these girders extending centrally throughout the entire length of the filter, dividing the same into large compartments, and at the same time affording a support for the liquid-supply pipe 25, while a number of transversely-arranged girders divide the filter into a series of compartments, each of a convenient size to be cleaned and renewed when necessary. On the filtering-support is packed sand or other suitable filtering medium, and on top of the sand are placed a series of bars forming a grating 25, of wood or metal, as desired.

At suitable intervals throughout the length of the filter are placed transverse I-beams 53, on which are supported, by suitable clamps 54, (shown in Fig. 12,) a series of distributing-pipes 55, one end of each of the distributing-pipes being connected to the main supply-pipe 25, and the opposite end of such pipe being provided with a removable cap or cover 56, which may be removed when the pipe needs cleansing. Each pipe 55 is provided with a series of open-top troughs 57, of a construction shown more clearly in Fig. 11, the troughs being arranged at equidistant intervals along the length of the pipe and the outer end of each trough being closed, so that the liquid supplied to the troughs through the pipes 25 and 55 will first fill such troughs and then flow in thin even regular film-like streams over the edges of the trough and be evenly and regularly distributed throughout the entire surface of the filter-bed, and at the same time, being finely broken up and falling through the air, will absorb oxygen and become more thoroughly purified. The discharge-pipes 55 at the ends of each compartment have a series of troughs on one side only, while those placed intermediate of the compartments are provided with troughs on both sides, so that each compartment will be separate and distinct and the supply of liquid be stopped by means of suitable valves 58 whenever it becomes necessary to clean one of the compartments or to renew the sand required.

For convenience in gaining access to the various portions of the superstructure a platform 59 extends entirely around the filter, and on the liquid-supply pipe 25 are arranged a series of brackets carrying a platform 60, extending for the full length of the filter and communicating by suitable stairways 61 with the platform 59. Extending entirely around the inner side of the outer row of posts is a plate 62, supported by cross-beams 63 and forming the outer support or boundary for the lower filter-bed 47, or it may be of masonry, onto which the liquid percolating through the filter 46 falls in drops to thoroughly oxidize the same, and is again and finally filtered through the lower bed before its discharge. This filter comprises a lower layer of various sizes of broken stone, slag, or pebbles of about six inches depth, on which is placed an intermediate thick layer of very coarse sand, the top layer being formed of clean gravel or broken stones, the upper and lower layers serving to hold the sand in place and to permit the free movement of the liquid and of the air through the filter. Around the whole structure are built a series of discharging-gutters 64, communicating with a series of transverse drains 65, each formed of a split terra-cotta or metal pipe or of brick or concrete, all being provided with perforated covers 66, which serve to keep out the filtering material, but permit the entrance to the draining-pipe of the filtered liquid and the free circulation of air through the filtering material. Each of the pipes 65 has its highest point at the center of the filter or at one side of the same and extends transversely from side to side thereof, its lower and discharge ends communicating directly with the gutters 64, and at the center or end of each drain-pipe is a vertical pipe 67, having an open top provided with a protecting hood or shield 68 to prevent the entrance of water and to allow the exit of air. The open top of the vertical pipe 67 extends above the level of the filter-bed and affords a free discharge for air, which will enter at the lower gutter end of the drain-pipe and pass through the same in a direction opposite to the direction of flow of discharging water, so that the surface of the water is again exposed to the oxidizing action of the air and further aerated and purified and at the same time providing abundant supply of air to the hardy bacilli maintained therein. Each of the transverse drain-pipes 65 is in communication with smaller longitudinal pipes 69, having their highest portion midway of the distance between two adjoining pipes 65, as shown more clearly in Fig. 9, and at such point being provided with a vertical stand-pipe 70, having a protecting-shield 71, and so arranged that the flow of the water through these pipes will be met by a counter-current of air passing from the transverse pipes 65 up through the pipes 69 and escaping through the pipe 70, thereby aerating the water and supplying air to the active and healthy micro-organisms within the filtering material.

The general arrangement of supporting-posts, transverse pipes 65, gutters 64, longitudinal pipes 69, and their various discharging-points and vertical ventilating-pipes are more clearly shown in the general diagram Fig. 10.

In operation the liquid entering through the pipe 25 is discharged into the pipes 55, and then flows into the various troughs 57, flowing over the edges of the latter in a thin even stream to the bed of the filter 46, being exposed to the oxidizing action of the air during the time it is falling from the troughs to the surface of the filter, and as the filter-bed is exposed on both of its surfaces to the air there will naturally be more or less air enter and pass through the filter to further oxidize the liquid and organic matter and to support the growth of such germs and micro-organisms purposely cultivated and maintained therein to purify the liquid with which it is brought into contact. The liquid after passing through the upper filter-bed falls in drops or in small streams through an air-space several feet high to the lower filter-bed, and in so doing each particle of the liquid is surrounded by air, and any oxidizable matter which may remain therein will be effectually destroyed, while the concussion from dropping of water onto the lower filter-bed will further purify it by the electricity thereby generated, and the liquid after striking and passing through the lower filter-bed, wherein the micro-organisms and circulating air are at work, as in upper bed, and after meeting the final currents of air in the drain-pipe 65 issues from the discharging-gutter 64 in a chemically and bacteriologically pure condition and may be discharged into a stream from which a drinking-supply is taken without injuring the water in any manner.

It is clear that where the nature of the liquid being treated makes it desirable that time should be given for sedimentation settling-tanks of any ordinary construction may be provided between the pumping-station and the filtering-beds. It is also clear that, if desired, either the upper or the lower filter-beds may be employed singly.

Having thus described my invention, what I claim, and desire to secure by Letters Patent, is—

1. An apparatus or plant for the treatment of liquids or sewage, comprising a screening-floor, a reservoir for the screened liquid below said screening-floor, a distributing-trough arranged above the screening-floor and adapted to distribute the liquid on the screening-floor in a thin, even, regular stream, means for inducing fresh-air currents across the path of the falling liquid both above and below the screening-floor, and upwardly through said screening-floor in the path of liquid traversing the same, a filter adapted to receive the screened liquid from the reservoir and to further purify the same, distributing-troughs for distributing said liquid in thin, even, regular streams or films over the parallel edges of the troughs to said filter-bed so that the liquid may be aerated in falling from the troughs, a lower filter-bed on which the filtered liquid falls to be further purified, and effluent drains leading from the lower portion of the lower filter-bed to convey away the purified liquid.

2. An apparatus for the treatment of liquids or sewage, comprising an upper filter-bed having an open or slotted bottom and exposed both above and below to permit of the free passage and purifying action of the air and to allow the partially-filtered liquid to percolate directly through the same so that it may thence fall from the lower surface of said filter-bed to the upper surface of a lower filter-bed, a lower filter-bed on which the liquid from the first filter-bed must fall in a series of minute streams or drops and in its passage through the air be further oxygenized before final filtration, and open-top distributing-troughs arranged at equidistant intervals above the upper surface of the upper filter-bed and acting to discharge the liquid in thin streams or films, which in falling to the filter-bed are exposed to the action of air and light.

3. The combination of the reservoir, a screening-floor therein extending completely over the top of the reservoir, a supply pipe or sewer leading to said reservoir at a point above the level of the screening-floor, and a distributing-trough in communication with said pipe or sewer so arranged as to retain the heavier solid matters which it receives and to distribute the liquid in an even and regular stream or streams on the surface of said screening-floor.

4. The combination in an inclosed structure, of the reservoir, a screening-floor therein, an open-top distributer constructed to allow the material to flow in thin, even, films or streams over its opposite edges arranged above the screening-floor, fresh-air ducts formed in the walls of the reservoir at points below the screening-floor, and foul-air ducts formed in the walls of the structure above the screening-floor in such manner as to induce the flow of air-currents in the path of the liquid being treated and through the screening-floor.

5. An apparatus or plant for the treatment of liquids or sewage, comprising a receiving-reservoir provided with a distributer for heavy and liquid matter, a stack in communication with the receiver, a screening-floor in the receiving-reservoir upon which the heavy matter accumulates and from which it may be removed, a filtering-bed arranged below the screening-floor and a reservoir located below said bed to receive the filtered liquid.

6. The combination of the reservoir, a series of girders arranged across the top of the reservoir, a grating supported by said girders, filtering material on said grating, a sectional grating situated above the filtering material, a pipe or sewer leading to the reservoir and communicating therewith at a point above the screening-floor, and a distributer in communication with said pipe or sewer and forming a sedimentation-trough for the collection of the heavier solid matters in the sewage.

7. In a plant for the treatment of sewage the combination in an inclosed structure of the reservoir, a skylight arranged for the admission of light-rays for purification purposes, a screening-floor extending across the top of the reservoir, said screening-floor being formed of upper and lower gratings and an intermediate layer of filtering material, a distributer arranged above the screening-floor and adapted to receive and distribute the liquid to be treated in an even and regular manner on the screening-floor, fresh and foul air ducts formed in the walls of the reservoir at points above and below the screening-floor for the induction of currents of fresh air.

8. The combination of the reservoir, a screening-floor therein, a liquid-supply pipe communicating with the reservoir at a point above the screening-floor, a distributer in communication with the liquid-supply, fresh-air ducts provided in the walls of the reservoir at points above and below the screening-floor, a chimney having a main flue for the escape of the products of combustion arising from the boiler of the plant or other source, and side flues communicating with foul-air vents provided in the walls of the reservoir at points above and below the screening-floor for inducing the flow of currents of air through and across the reservoir and through the screening-floor, substantially as specified.

9. The combination in an inclosed structure of the reservoir, a series of girders, 12, extending across the top of said reservoir, a screen, 11, resting on said girders, an upper sectional removable screen, 10, filtering material situated between said screen, an inlet pipe or sewer communicating with the reservoir at a point above the screening-floor, and a distributer in communication with said pipe or sewer and adapted to distribute the liquid in a thin, even regular stream on the screening-floor.

10. The combination of the reservoir, a screening-floor extending across the top of the reservoir and comprising upper and lower screens, 10 and 11, and intermediate filtering material between the screens, an inlet pipe or sewer communicating with the reservoir at a point above the screening-floor, a series of shoes or blocks resting on the screening-floor and a distributer, 5, supported by said shoes or blocks and adapted to receive and distribute the liquid being treated.

11. The combination of the reservoir, a screening-floor extending across the top of said reservoir, a fresh-air duct, 16, formed in the wall of the reservoir below the screening-floor, a fresh-air duct, 19, formed in the walls of the reservoir at a point above the screening-floor, a chimney having a central flue and annular vent-flues, and foul-air ducts, 17 and 18, formed in the walls of the reservoir at points below and above the screening-floor, respectively, and communicating with said annular vent-flues, substantially as specified.

12. The combination of the supporting-girders, a filter-support carried thereby, filtering material, a slatted floor arranged above the filtering material, a liquid-supply pipe or channel, a series of distributing-troughs communicating with said supply-pipe and arranged above the filtering-floor at equidistant intervals in such manner as to provide for the even and regular distribution of the liquid to be treated.

13. The combination in a filter of a series of girders arranged in such manner as to support the filtering material and to divide the filter into a series of sections or compartments, filtering material carried by said girders and arranged between upper and lower slatted floors in such manner as to provide for the circulation of air through the filter, a liquid-supply pipe or channel arranged above the filter and a series of open-top distributing-troughs arranged at equidistant intervals and adapted to distribute the liquid in an even and regular manner to the surface of the filter.

14. A distributer for a filtering-bed comprising a supply-pipe having an open end normally closed by a removable cap or cover, and a series of equidistant distributing-troughs carried by and in communication with said distributing-pipe, each of said troughs having an open top and a closed end.

15. A distributer for a filtering-bed comprising a valved supply-pipe, a removable cap or cover, 56, normally closing the end of said pipe, a series of equidistant distributing-troughs 57, communicating at one end with said pipe and closed at their opposite ends, substantially as specified.

16. The combination in an elevated filter structure of the supporting-posts, 44, carrying girders, 49, and 48, supported by said pillars, division-girders, 51, for dividing the filter into a series of independent sections or compartments, filter-supports, 50, supported on the girders, 49, filtering material carried by the filter-support, removable slatted floors, 52, on top of the filtering material, a main supply-pipe, 25, a series of distributing-pipes, 55, in communication with the main supply-pipe and a series of equidistant distributing-troughs, 57, in communication with the pipes, 55, and extending out over the various sections of the filter in such manner as to distribute the liquid to be filtered in an even and regular manner.

17. In a filtering system the combination of the superimposed beds of filtering material, the lower of which is adapted to receive the liquid falling from the under surface of the upper filter, a series of supply-pipes extending over the upper bed of filtering material and equidistant distributing-troughs in communication with said supply-pipe, substantially as specified.

18. In a filter the combination of a series of open gutters or pipes having screen or foraminous tops arranged to form a drainage and air-circulation system, air-outlets provided at the highest point of said pipes and a bed of filtering material provided above said pipes.

19. The combination of a filtering apparatus consisting of upper and lower filter-beds upon which the liquid is adapted to be distributed, a conduit or drain located beneath the lowermost filter-bed and adapted to receive the liquid, said conduit being inclined, and means for inducing drafts of air in the space between the filter-beds and in said conduit or drain to aerate the falling liquid.

20. The combination of a filtering apparatus comprising upper and lower filter-beds separated by an aeration-space, upon which apparatus the liquid to be treated is adapted to be discharged, with effluent drains located below the lowermost filter-bed and adapted to receive the liquid therefrom, said drains being inclined from the center toward each side of the filter-bed, and means for creating a draft within said drains, substantially as specified.

21. In a filter, a series of drainage-pipes inclined from the center of the filter to the discharge end, vertical vent-pipes provided at the highest points of said drainage-pipes, and a bed of filtering material provided above said drainage-pipes, substantially as specified.

22. The combination of the receiving-reservoir, a screening-floor therein, an open-top distributer adapted to distribute the material to be filtered in thin streams or films, said distributers being in communication with the supply pipe or sewer and arranged above said screening-floor, a lower filtering-bed having effluent drains and ventilators, an elevated filtering-bed arranged above the lower filtering-bed, distributing-troughs arranged above the upper filtering-bed and piping connections between the receiving-reservoir and the distributer-troughs.

23. An apparatus or plant for the treatment of liquids or sewage, comprising a receiving-reservoir provided with a distributer for heavy and liquid matter, a stack in communication with the receiver, a screening-floor in the receiving-reservoir upon which the heavy matter accumulates and from which it may be removed, a filtering-bed arranged below the screening-floor, a conduit located below said bed to receive the filtered liquid, a filtering apparatus consisting of superposed filter-beds upon which the liquid from the conduit is distributed, and means for agitating and aerating the liquid between the filter-beds, substantially as specified.

24. An apparatus or plant for the treatment of liquids or sewage, comprising a receiving-reservoir provided with means for separating the heavy matter from the liquid, a filtering apparatus consisting of a series of superposed filter-beds separated by aeration-spaces, upon which the liquid from the reservoir is distributed, and effluent drains located below the lowermost bed of the series and adapted to induce further aeration of the filtered liquid and to collect the same, substantially as specified.

25. An apparatus or plant for the treatment of liquids or sewage, comprising a receiving-reservoir, a screening and filtering floor located in said reservoir, a chimney or stack connected to said reservoir to remove the foul air, a conduit leading from the lower portion of the reservoir, a pump, a pipe connecting the same to the conduit, a filtering apparatus comprising upper and lower filter-beds separated by an aeration-space, upon which apparatus the liquid from the pump is adapted to be discharged, effluent drains located below the lower filter-bed and adapted to receive the liquid therefrom, said drains being inclined from the center toward each side of the filter-bed, and means for creating a draft within said drains, substantially as specified.

26. An apparatus or plant for the treatment of liquids or sewage, comprising a receiver and separator, a pump connected therewith and adapted to remove separated liquid matter therefrom, a filtering apparatus consisting of upper and lower filter-beds upon which the liquid is adapted to be pumped, a conduit located beneath the lowermost filter-bed and adapted to receive liquid, said conduit being inclined, and means for inducing drafts of air in the space between the filter-beds and in said conduit to aerate the falling liquid, substantially as specified.

In witness whereof I have hereunto set my hand this 8th day of April, A. D. 1896.

JOHN JEROME DEERY.

Witnesses:
 EDMUND S. MILLS,
 HORACE PETTIT.